United States Patent
Goodfellow-Jones et al.

(10) Patent No.: US 12,030,648 B2
(45) Date of Patent: Jul. 9, 2024

(54) ICE REMOVAL SYSTEM

(71) Applicant: GKN Aerospace Services Limited, Redditch (GB)

(72) Inventors: Stephen Goodfellow-Jones, Redditch (GB); Ashley Brooks, Redditch (GB)

(73) Assignee: GKN Aerospace Services Limited, Redditch (GB)

(*) Notice: Subject to any disclaimer, the term of this patent is extended or adjusted under 35 U.S.C. 154(b) by 958 days.

(21) Appl. No.: 17/041,663

(22) PCT Filed: Mar. 29, 2019

(86) PCT No.: PCT/GB2019/050936
§ 371 (c)(1),
(2) Date: Sep. 25, 2020

(87) PCT Pub. No.: WO2019/186206
PCT Pub. Date: Oct. 3, 2019

(65) Prior Publication Data
US 2021/0129998 A1 May 6, 2021

(30) Foreign Application Priority Data
Mar. 29, 2018 (GB) ...................................... 1805284

(51) Int. Cl.
*B64D 15/12* (2006.01)
*B32B 27/08* (2006.01)
(Continued)

(52) U.S. Cl.
CPC .............. *B64D 15/12* (2013.01); *B32B 27/08* (2013.01); *B32B 27/288* (2013.01);
(Continued)

(58) Field of Classification Search
CPC ...... B64D 15/12; B64D 15/163; B32B 27/08; B32B 2250/05; B32B 2250/24;
(Continued)

(56) References Cited

U.S. PATENT DOCUMENTS 4,690,353 A * 9/1987 Haslim ................ B64D 15/163
318/116
4,875,644 A * 10/1989 Adams ................ B64D 15/163
244/134 R
(Continued)

FOREIGN PATENT DOCUMENTS

CA 2233282 A1 * 10/1998 ............. B64D 15/12
CA 3060759 A1 * 6/2020 ............. B64D 15/00
(Continued)

OTHER PUBLICATIONS

International Search Report and Written Opinion for PCT/GB2019/050936 mailed Jul. 18, 2019 (20 pages).
(Continued)

*Primary Examiner* — Benjamin P Lee
(74) *Attorney, Agent, or Firm* — Bejin Bieneman PLC (57) ABSTRACT

An ice removal apparatus for an aircraft is provided comprising a laminate structure encapsulating an electrically operable heater. The laminate structure comprises a plurality of layers and at least two layers are configured to be selectively movable relative to each other to increase the separation of the two layers, thereby removing ice.

19 Claims, 9 Drawing Sheets

(51) Int. Cl.
*B32B 27/28* (2006.01)
*B64D 15/16* (2006.01)
*H05B 3/36* (2006.01)

(52) U.S. Cl.
CPC ............ *B64D 15/163* (2013.01); *H05B 3/36* (2013.01); *B32B 2250/05* (2013.01); *B32B 2250/24* (2013.01); *B32B 2307/206* (2013.01); *B32B 2307/30* (2013.01); *B32B 2605/18* (2013.01); *H05B 2203/005* (2013.01); *H05B 2203/016* (2013.01)

(58) Field of Classification Search
CPC .......... B32B 2307/206; B32B 2307/30; B32B 2605/18; H05B 3/36; H05B 2203/005; H05B 2203/016
See application file for complete search history.

(56) References Cited

U.S. PATENT DOCUMENTS

| | | | | |
|---|---|---|---|---|
| 4,894,569 A * | 1/1990 | Lardiere, Jr. | ........... | H01F 7/202 318/116 |
| 5,098,037 A * | 3/1992 | Leffel | .................. | B64D 15/166 244/134 A |
| 5,129,598 A * | 7/1992 | Adams | ................. | B64D 15/163 244/134 A |
| 5,142,767 A * | 9/1992 | Adams | ................ | H01F 17/0006 336/200 |
| 5,152,480 A * | 10/1992 | Adams | .................. | B64D 15/12 244/134 D |
| 5,314,145 A * | 5/1994 | Rauckhorst, III | ... | B64D 15/166 244/134 A |
| 5,326,051 A * | 7/1994 | Pisarski | ............... | B64D 15/163 216/13 |
| 5,346,160 A * | 9/1994 | Pisarski | ............... | B64D 15/163 244/134 R |
| 5,427,332 A * | 6/1995 | Rauckhorst, III | ..... | B64D 15/16 244/134 A |
| 5,553,814 A | 9/1996 | Rauckhorst, III et al. | | |
| 5,553,815 A * | 9/1996 | Adams | ................. | B64D 15/163 244/134 R |
| 5,558,304 A | 9/1996 | Adams | | |
| 5,657,952 A | 8/1997 | Goldberg | | |
| 5,686,003 A * | 11/1997 | Ingram | .................. | B64D 15/12 219/528 |
| 5,743,494 A * | 4/1998 | Giamati | ................. | B64D 15/00 244/134 A |
| 5,782,435 A * | 7/1998 | Ingram | ................ | B64D 15/163 335/226 |
| 5,921,502 A | 7/1999 | Al-Khalil et al. | | |
| 6,129,314 A * | 10/2000 | Giamati | ............... | B64D 15/163 244/134 A |
| 6,283,411 B1 * | 9/2001 | Giamati | ................. | B64D 15/12 244/134 A |
| RE38,024 E * | 3/2003 | Adams | ................. | B64D 15/163 244/134 A |
| 8,931,740 B2 * | 1/2015 | Nordin | ...................... | B64C 3/26 244/134 R |
| 9,108,735 B2 * | 8/2015 | Olson | .................. | B64D 15/163 |
| 2004/0149734 A1 * | 8/2004 | Petrenko | .................. | H05B 3/84 219/538 |
| 2010/0206990 A1 * | 8/2010 | Petrenko | .............. | B64D 15/163 62/331 |
| 2013/0228653 A1 | 9/2013 | Breer et al. | | |

FOREIGN PATENT DOCUMENTS

| | | | |
|---|---|---|---|
| GB | 2130158 A | 5/1984 | |
| WO | 95/34189 A1 | 12/1995 | |
| WO | WO-9637406 A1 * | 11/1996 | ........... B64D 15/163 |

OTHER PUBLICATIONS

UKIPO Combined Search and Examination Report under Sections 17 and 18(2) for Application No. GB1805284.5 mailed Sep. 25, 2019 (7 pages).

* cited by examiner

FIG. 8A / FIG. 8B — Hybrid De-Ice System

FIG. 9A / FIG. 9B — Hybrid Running Wet De-Ice System

ICE REMOVAL SYSTEM

CROSS-REFERENCE TO RELATED APPLICATIONS

This application is a national stage of, and claims priority to, Patent Cooperation Treaty Application No. PCT/GB2019/050936, filed on Mar. 29, 2019, which application claims priority to Great Britain Application No. GB1805284.5, filed on Mar. 29, 2018, which applications are hereby incorporated herein by reference in their entireties.

TECHNICAL FIELD

The present invention is concerned with aerospace ice-protection systems and specifically, but not exclusively, to an ice-protection system (IPS) that is capable of being used with small to medium sized aircraft as well as larger commercial aircraft.

BACKGROUND

Aerospace surfaces such as wing leading edges or engine nacelles (or the like) are prone to ice accretion during flight as the cold outer surfaces of the component come into contact with water during flight, landing, taxi or take-off.

Ice build-up can change the aerodynamic profile or shape of the component thus changing the functionality of the component. This can have disastrous consequences. In an engine nacelle ice may be ingested into the engine, which again can potentially have very serious and dangerous results.

To solve these issues a number of heating systems have been employed in different aircraft. One system involves using hot exhaust gas from the engines which can be directed to the desired surface (for example along the leading edge of a wing). This has the advantage of using the unwanted heat from the exhaust gas. In an alternative arrangement electrical heaters are applied to the aircraft surfaces prone to icing and an electrical current passed through the heaters. The advantage of this system is that it allows complex and distributed heating systems to be deployed around the aircraft. In fact this system has become the industry's preferred solution to ice accretion.

However, a drawback of electrical heating systems is their complexity and power consumption which must be fed from the electrical generators in the engines. In larger aircraft, for example with multiple engines, the electrical generators have the capacity to power the electrical heaters. This is not the case for smaller aircraft.

SUMMARY

The system described herein provides an alternative de-icing system that minimises electrical consumption whilst maintaining de-icing capability.

Viewed from a first aspect disclosed herein there is provided an ice removal system for an aircraft, said system comprising a laminate structure encapsulating an electrically operable heater, wherein the laminate structure comprises a plurality of layers and at least two layers are configured to be selectively movable relative to each other to increase the separation of the two layers.

Thus, a system is provided which combines an electrical heater with an expandable or movable structure. Specifically, the expansion is in a direction perpendicular to the surface of the heater surface such that the surface displaces outwards from the surface onto which it is formed or connected. Parts of the surface can thereby be configured to move away or out of the heater surface to disturb the shape or contours of the heater surface.

The system described herein thereby provides a combination or hybrid ice removal system that can simultaneously heat a surface and displace a surface and this advantageously allows ice can be both melted and mechanically or physically cracked or pushed away from the surface.

Aircraft regulations require aircraft which encounter icing conditions to be equipped with a mechanism to prevent or remove the formation of ice on wings and control systems. As discussed above aircraft typically achieve this by bleeding hot gases from the engine or using electrical heating elements on the leading-edge structures.

Examples of this technology include the Boeing 787, which incorporates a heater mat technology. As also described above, the application of this technology to smaller aircraft is however limited by the ability of the aircraft to generate sufficient electrical power.

The system includes a thin, flexible, single-layer integrated heater and actuator manufactured from a combination of etched and/or deposited metallic tracks encapsulated within a thermoplastic/glass fibre composite laminate. This is in contrast to existing examples of ice removal systems which use discrete, separate components for actuation and heating which then have to be assembled.

The system described herein is applicable to any surface on which ice may build up. In an aircraft skin application, for example, the integrated functional layer may be bonded between a thin metallic erosion shield skin and a structural composite or metallic skin.

The system described herein provides a number of technical advantages including:

- The actuators inside the functional layer are close to the surface, meaning that the efficient deflection of the surface can be achieved without compromising structural stiffness, and whilst still being protected from damage and environmental conditions, and whilst avoiding surface deformation/waviness.
- The actuators in the functional layer are supported by the structural skin. No additional backing structure is needed, which saves weight and space).
- The system frees up space inside the structure (only wire routing required).
- Actuator performance is immune to the proximity of structural nodes (e.g. ribs), and the actuator can be located at any point along the structure.
- An actuator (or heater) failure can be addressed by replacement of the functional layer, which can be designed to be de-mountable, or by replacement of the leading edge skin.
- There is no "dead zone" between the heater and the actuator, improving performance as a de-icer.
- The hybrid functional layer can incorporate the actuator by using existing manufacturing processes and materials.
- The functional layer (with the exception of the wiring terminations) is entirely conformal and minimises the impact of the system from an integration perspective.
- The functional layer can be supplied for assembly as a single, flexible layer in the manufacturing process for the aircraft structure in question, reducing manufacturing costs.

The thermoplastic/glass functional layer laminate incorporates the following:

Etched copper actuator conductors, arranged as a pair of parallel conductors one on top of the other with a controlled gap. When a high-current pulse is supplied in opposite directions in each conductor, the electromagnetic forces cause them to repel and move apart with considerable force. The magnitude of deflection achieved is of the order 0.5-1.0 mm.

A release layer between the actuator conductor which maintains a minimum gap and allows the conductors to move apart without damaging the surrounding laminate. After the actuator has fired, the conductors should return to their original position under the influence of vacuum forces.

Etched copper heating element terminations and bus bars.

Deposited metallic heating elements, close to the OML (outer mold line) of the laminate and electrically insulated from the actuator conductors.

It will be recognised that the laminate structure may comprise a variety of different layer configurations. For example, the laminate may be in the form of:

a first thermoplastic heat dissipation layer;
a second electrically operable heating element layer;
a third electrically insulating thermoplastic layer;
a fourth electrically insulating thermoplastic layer;
a fifth electrical power supply layer; and
a sixth thermoplastic backing layer
wherein an electrical actuator is located between the third and fourth thermoplastic layers.

Thus, a multi-layer laminate is defined including an actuator within, i.e., embedded or encapsulated, within the laminate.

The actuator is thin to minimise the weight of the system and thus, advantageously the electrical actuator may be in the form of a pair of opposing electrical conductors separated by an electrical insulator.

Ampere's force law means that a repulsive force can be generated between two conductors by virtue of the magnetic field each conductor generates and the interaction of those fields. Thus, a very small movement can be generated in the laminate structure using this principle. Pulsing an electrical current can cause pulses in movement of the actuator and thus pulses in movement of the surface of the laminate which is caused to rise and fall as the pulse current is applied.

The conductors may be any suitable shape depending on the application and shape of the surface to be de-iced.

Advantageously the opposing electrical conductors may be in the form of parallel and overlapping electrically conductive tracks. By overlapping the tracks the maximum force effect can be realised.

To allow for the movement and for the generation of the force the tracks must be electrically insulated from one another. For example, the opposing electrical conductors may be separated by an elastomeric layer, with suitable mechanical dielectric strength for the voltages in use.

One or both of the conductors may be free to move to maximise the movement created by Ampere's law, i.e., one or both of the electrical conductors may be free to move relative to the electrical insulator. Thus, the movement can be translated to the outer surface of the de-icing structure since the conductor movement is not inhibited by being bonded or connected to the insulator.

To electrically excite or energise the apparatus the electrical conductors are arranged in use to be electrically coupled to an electrical supply.

Also, in order to achieve the Ampere law effect the electrical conductors are electrically connected together at one end and arranged to be electrically coupled to an electrical supply at the other end.

In order to make the laminate structure continuous, the structure may be provided with thermoplastic fillers located adjacent to each of the electrical conductors between the third and fourth thermoplastic layers. These fillers 'fill' the gap in the laminate created by the thickness of the two conductors and the insulating layer between them.

In order to provide power to the heating layer an electrical path may be provided between the second electrically operable heating element layer and the fifth electrical power supply layer.

The heating element itself may be a serpentine track for example of conducting copper for example. Passing a current through the track creates heat.

The heating element may be applied in a variety of conventional ways or using more advanced techniques such as flame sprayed copper. The electrical conductors and the electrical power supply layer may similarly be applied in a variety of ways including, for example, copper etched layers.

The choice of layers will be dependent on whether it is arranged to carry current to create heat, or to supply the current (without creating heat) to a location where it will be used to create heat.

To form a solid state apparatus or de-icing layer or mat the laminate may be cured together, for example in an autoclave where a thermoplastic material softens and adheres to an adjacent layer. Thus, adjacent layers which are immediately adjacent are connected to each other with the exception of the two opposing electrical conductors.

Thus, in effect, a laminate structure is formed comprising a plurality of thermoplastic layers encapsulating a plurality of electrical conducting layers.

As discussed above the insulator between the two conductors must be configured to allow the one or both conductors to move apart relative to one another. To achieve this the electrical insulator located between the electrical conductors may be in the form of a thermoplastic material comprising a discontinuity allowing the insulator outer surfaces to move apart relative to each other.

For example, the discontinuity may be in the form of a slit extending in a plane within the layer and parallel with the outermost surfaces of the layer. This slit or discontinuity allows the insulator to expand such that if it is coupled to the conductors they may still move. In an alternative arrangement one or both of the conductors may be un-bonded to the outer surfaces of the insulator thereby achieving the same effect.

It will be recognised that there are many ways the layers can be configured to allow for relative movement of the two conductors whilst maintaining their electrical isolation. For example in another arrangement the electrical insulator could be in the form of two independent sub-layers immediately adjacent to each other.

A variety of material may be used for the layers within the laminate. For example, a polyetheretherketone (PEEK) material may be used for one or each of the thermoplastic and insulating layers.

The conductors forming the actuator may be any suitable shape. Advantageously the conductors may be overlapping elongate tracks having a constant width and cross-section. Thus a uniform force and movement may be created.

The tracks may be configured to follow the contour of the aerodynamic shape which is to be de-iced and may be continuous or curved, zig-zag or any desired shape.

By changing the surface area and or cross-sectional thickness of the conductors different current densities can be created thereby allowing different displacements or movement to be achieved along the conductor and de-icing apparatus. For example, the electrical conductors may be overlapping elongate tracks with varying widths defining regions of greater and less surface areas. Non-uniform displacements can then be created.

Additionally, areas of greater displacement i.e. greater force may advantageously be aligned with structural components of the aerospace component thus ensuring the forces do not damage any delicate or fragile parts of the structure. In a wing, the regions of greater force could for example be arranged to align with the ribs of a wing for example.

The outer surface of the apparatus may also be provided with a metallic erosion shield skin. A structural composite or metallic skin may also be applied on a second opposing side of the apparatus. Thus, a premade de-icing system can be manufactured and delivered for installation.

It will be recognised that the de-icing apparatus is particularly applicable to leading edges or nacelles of aerodynamic components which will be curved or have rounded contours. The layers can thus be formed in a shape corresponding to the desired application profile.

The system described herein provides a de-icing system for an aircraft comprising an apparatus as described herein and one or more electrical control and supply devices arranged to electrically excite the electrical heating element and the electrical actuator. A complete system may thereby be provided.

The conductors may be excited in a variety of different manners to achieve different displacements, different displacement profiles and/or different resonances or waves along the apparatus. Also, depending on the application a component such as a wing may comprise more than one de-icing apparatus which may advantageously be simultaneously or independently controlled. Independent control allows the electrical power requirements of the de-icing system to be managed; a particularly important aspect for smaller aircraft.

There is provided a de-icing system for an aerospace component comprising a first electrically operable heating circuit and a second electrically operable displacement circuit, wherein the second displacement circuit is in the form of at least one pair of adjacent electrical conductors separated by an electrical insulator, and wherein the electrical conductors are arranged such that simultaneous electrical excitation of the conductors creates a separating force between the conductors causing the conductors to move away from each other.

As described above, the tracks forming the conductors may be any suitable shape. Advantageously the tracks may be generally flat, thin and rectangular elongate tracks which may be conveniently etched in copper onto a thermoplastic surface. As described above importantly the tracks must be adjacent to each other to benefit from the Ampere force law effect. Parallel, thin and flat rectangular tracks are therefore advantageous.

An elongate and thin conductor may also be conveniently caused to ripple or to allow a wave to be generated along its length which may advantageously disrupt ice which is located on the surface of the aerospace component. For example, a resonant frequency may be achieved along the track again disrupting the ice.

Viewed from a still further aspect, there is provided a method of manufacturing a de-icing apparatus for an aircraft comprising the steps of:
(A) forming a laminate structure comprising at least:
  a first thermoplastic heat dissipation layer;
  a second electrically operable heating element layer;
  a third electrically insulating thermoplastic layer;
  a fourth electrically insulating thermoplastic layer;
  a fifth electrical power supply layer; and
  a sixth thermoplastic backing layer
    wherein an electrical actuator is located between the third and fourth thermoplastic layers; and
(B) curing the structure to bond one or more of the layers together to form a continuous structure.

Thus, a method of manufacturing a de-icing apparatus and system is thereby provided in which a laminate structure is laid-up and then cured to create a continuous structure.

There is provided an electrically powered heater mat for an aircraft structure comprising a heating element and an electrically powered actuator encapsulated within the mat, wherein the actuator is in the form of a pair of adjacent electrical conductors which, when simultaneously electrically excited cause the mat surface to be displaced in a direction perpendicular to the mat surface.

For example the system may be supplied in a heater mat format which may be formed into a desired profile and then cured to harden into the desired aerodynamic shape.

There is provided a de-icing apparatus for a leading edge of an aerospace component, the apparatus comprising an electrical heater embedded in a portion of the apparatus for alignment with the leading edge of the aerospace component and one or more actuators embedded in a portion of the apparatus for alignment with a trailing region of the aerospace component with respect to the leading edge.

A combination of one or more actuators and separate heating zone may be employed. The heating zone may be realised in a conventional way, for example using a conventional electrically operated heating mat (a heating element embedded within the structure defining the leading edge profile).

The actuator may be realised in the same manner as described above but optionally with or without the integrated heating layer.

Thus, two arrangement may be provided.

A first arrangement comprises a leading edge electrically operable heater to heat any ice build-up and one or more actuators arranged down-stream from the leading edge which may be independently or simultaneously operated. The arrangement may then be operated to melt the ice at the leading edge. The ice turns to water which then flows from the leading edge along the trailed surface down-stream of the leading edge and re-freezes (as it leaves the heated surface). By locating one or more actuators at the zone where the ice re-freezes it is possible to mechanically discharge or eject the re-frozen ice from the surface and thus the wing.

Advantageously the electrically operable actuators consume far less electrical power than a heated surface and so it is not necessary to heat the entire leading edge and part of the adjacent trailing surface of the wing. Thus, a de-icing system can be realised which is a hybrid or combination of an existing heater mat approach and embedded actuator. Such a system consumes less electrical power whilst still de-icing the structure. This allows the system to be deployed on smaller aircraft and even to un-manned aerial vehicles (UAVs).

The actuators may optionally and additionally be provided with a heater layer are described above, thus providing the second optional arrangement. This may be useful in application where heavy ice layers build up. The embedded heater in the actuator can then weaken the interface layer between the ice and the surface and then the actuator activated to create a displacement or wave of displacement which dislodges the ice.

Purposely allowing the ice to reform along a trailing section of the wing may seem counter-intuitive but it allows a wing to be de-iced using a fraction of the electrical power, e.g., following the steps of:

(A) electrically exciting the heating element to cause ice to melt and flow from the leading edge towards the trailing edge;
(B) allowing ice to re-form at a portion of the trailing edge adjacent to the at least one actuator; and
(C) activating the at least one actuator to cause the ice to separate from the trailing edge surface.

Another arrangement of de-icing an aerospace component such as a wing involves secreting a de-icing fluid onto the surface which has frozen. In effect a liquid is released onto the surface which causes the ice to break down and can then flow away from the critical zones or areas of the aerospace component. Such liquids are known as freezing point depression liquids or FPDs. One such example is an ethylene glycol-based fluid.

Advantageously the same actuator and optional heating layer may be used in combination with such a fluid ice protection system. In the same way that the conventional heating mat described above may be used in combination with the actuator and optional heater described herein it may be used in precisely the same way with a fluid system i.e. located down-stream of the leading edge area where the fluid is deployed.

Using the de-icing apparatus described herein presents a number of advantages for fluid systems (which are often used for emergencies since large volumes of liquid cannot be carried on board the aircraft).

For example, locating a de-icing apparatus described herein down-stream but adjacent to a leading edge using a fluid secretion systems allows the fluid to flow for a longer period along the wing without re-freezing, it also allows for smaller quantities of fluid to be carried and/or lower concentrations of fluid to be used having environment benefits.

The fluid itself may be secreted for example from a conduit at or near to the leading edge. For example, a region of the apparatus aligning with the leading edge may comprise a perforated surface for communication of fluid from the conduit through the leading edge.

To further enhance the arrangement the perforated surface may additionally include an electrical heater arranged in use to heat the leading edge surface.

The actuators may not comprise the heating layer as described above, and instead there is provided a fluid secreting ice-protection system comprising a fluid delivery conduit for alignment with a leading edge surface of an aerospace component, the system further comprising one or more actuators embedded in a portion of the apparatus for alignment with a trailing region of the aerospace component with respect to the leading edge.

Again, the region of the apparatus aligning with the leading edge may comprise a perforated surface for communication of fluid from the conduit through the leading edge.

It will be recognised that the present disclosures may be applied to a variety of aerospace surfaces including, but not limited to aircraft wings, tail, stabilisers, engine nacelles, helicopter rotor blades and so forth.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The invention is further described with reference to the following examples. It will be appreciated that the invention as claimed is not intended to be limited in any way by these examples. It will also be recognised that the invention covers not only individual embodiments but also combination of the embodiments described herein.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the spirit and scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

DETAILED DESCRIPTION

Figure 1:
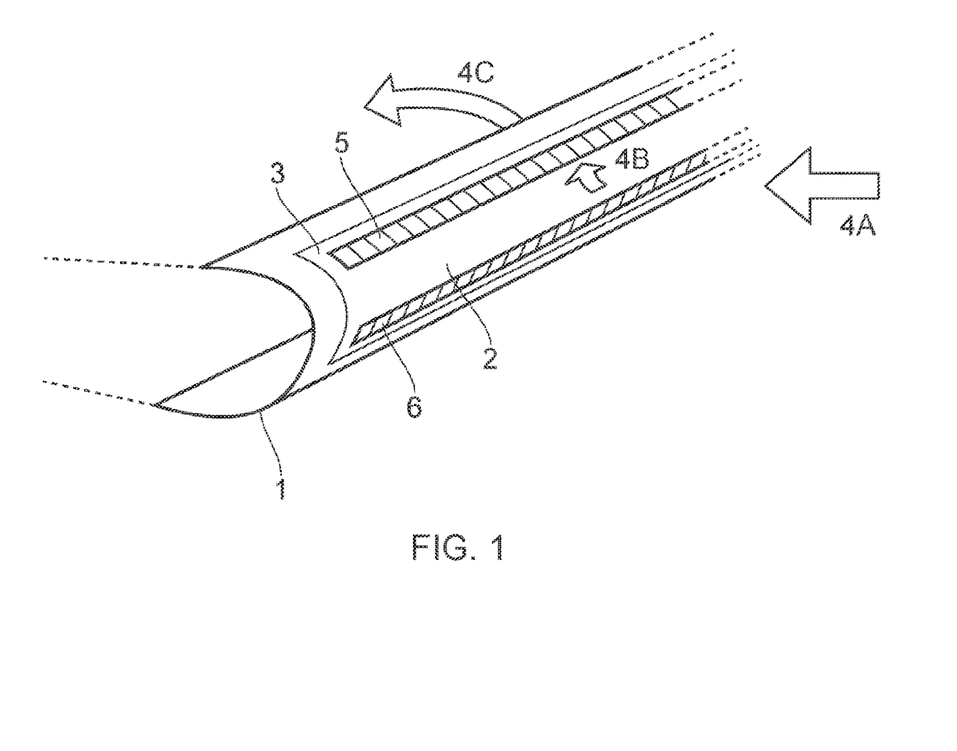
FIG. 1 shows a schematic of leading edge of an aircraft wing.

FIG. 1 shows the leading edge of an aircraft wing 1.

The wing 1 comprises a leading edge 2 which is a curved profile forming the front or up-stream part of the wing. The wing creates lift by separating airflow into two streams on the upper and lower surfaces of the wing.

Extending from the top and bottom surface of the leading edge 1 are the trailing regions 3 or areas which extend from the leading edge away from the front of the wing towards the trailing edge (not shown at the rear of the wing). Only a section of the wing is shown in FIG. 1 but it will be recognised that the wing extends from the fuselage of the aircraft to the wing tip.

The arrows 4A, 4B and 4C show the airflow over the surfaces. As the aircraft is pushed through the air the air 4A approaches the wing leading edge 2 and impinges or collides with the surface. Air is directed as shown by arrow 4B around the curved surface towards the flow 4C on the upper surface of the wing. The same occurs on the lower surface of the wing.

Air impinging on the leading edge may contain water vapour and owing to the altitude of aircraft the airframes can become extremely cold causing ice to form on the wing surfaces.

The disclosures herein provide a variety of novel ways to de-ice or release ice from these wing surfaces (as well as other aerodynamic surfaces) using a particular laminate structure which provides an electrically operable actuator surface optionally in combination with an electrical heater.

The term "actuator" is intended to refer to something that causes movement i.e. displacement. By causing displacement of a surface at the wing surfaces ice can be caused to crack and/or break away from the wing surface.

Only small movements are required for this to be achieved as will be described. What is required is sufficient movement of the surface to break the adhesion between the ice and the outer surface of the wing (or aerodynamic component). The high velocity airflow then carries the ice away from the surface.

Returning to FIG. 1 the possible position of the de-icing system is shown by de-icing apparatus 5 and 6. As shown they are located not along the front of the leading edge but on a trailing portion of the wing relative to the leading edge i.e. adjacent to the leading edge but down-stream from it in an airflow direction.

It will be recognised that the laminate structure of the de-icing apparatus described herein will have a shape corresponding to the particular profile of the aerodynamic component to which it is applied. In FIG. 1 a leading edge of a wing is shown and thus the de-icing apparatus would have a curved, somewhat semi-circular profile as illustrated in FIG. 1.

The structure of a laminate forming a de-icing apparatus described herein will now be described in which a slice through the cross-section of the laminate is illustrated.

Figure 2:
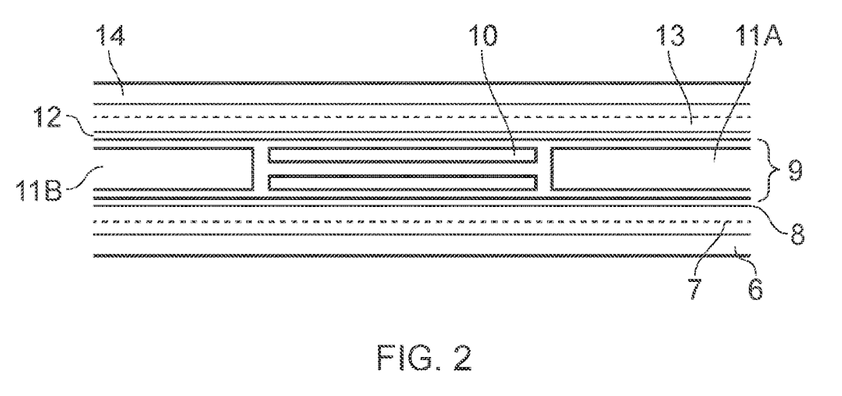
FIG. 2 shows a cross-section through an actuator/heating apparatus.

FIG. 2 shows such a cross-section through the laminate structure forming part of the de-icing apparatuses described herein.

The laminate is arranged for connection to the aircraft outer surface and comprises (working from the bottom layer shown in FIG. 2) a thermoplastic backing layer 6. An electrical circuit 7 is formed on the layer 6 by etching copper tracks which can receive electrical power. This circuit or track provides the electrical heated circuit described below.

The copper tracks 7 are sandwiched between layer 6 and another thermoplastic layer 8.

The central portion 9 of the laminate comprises an electrically operable actuator 10 which will be described with reference to FIG. 3 below. FIG. 2 illustrates the optional filler portions 11A and 11B which are located on either side of the actuator 10 and which fill in the spaces between layer 8 and the next thermoplastic layer 12 located above the actuator 10. These filler portions 11A and 11B fill the gaps created in the laminate by the thickness of the actuator 10 and provide a uniform thickness and outer surface to the overall laminate.

Next a flame sprayed or otherwise copper heating circuit 13 is applied to the top of the thermoplastic layer 12 in a profile (layout) that corresponds to the desired heat output profile that is desired for the heated region. Finally a further upper thermoplastic layer 14 formed the upper surface of the di-icing apparatus.

Optionally a further erosion shield may be applied to the upper surface 14 and a corresponding composite or metallic backing layer to the lower surface of layer 6 (both not shown).

Any suitable thermoplastic material may be used for the laminate layers. However, polyetheretherketone (PEEK) is particularly suitable owing to its electrical insulation properties and thermal conductivity.

The centrally located actuator 10 will now be described with reference to FIG. 3. The actuator 10 causes relative movement of one portion 15A with respect to the other half of the actuator 15B. The relative movement may be achieved according to Ampere's force law i.e. that attractive or repulsive forces can be generated between electrical conductors that are adjacent to each other by supplying opposing current directions.

Figure 3:
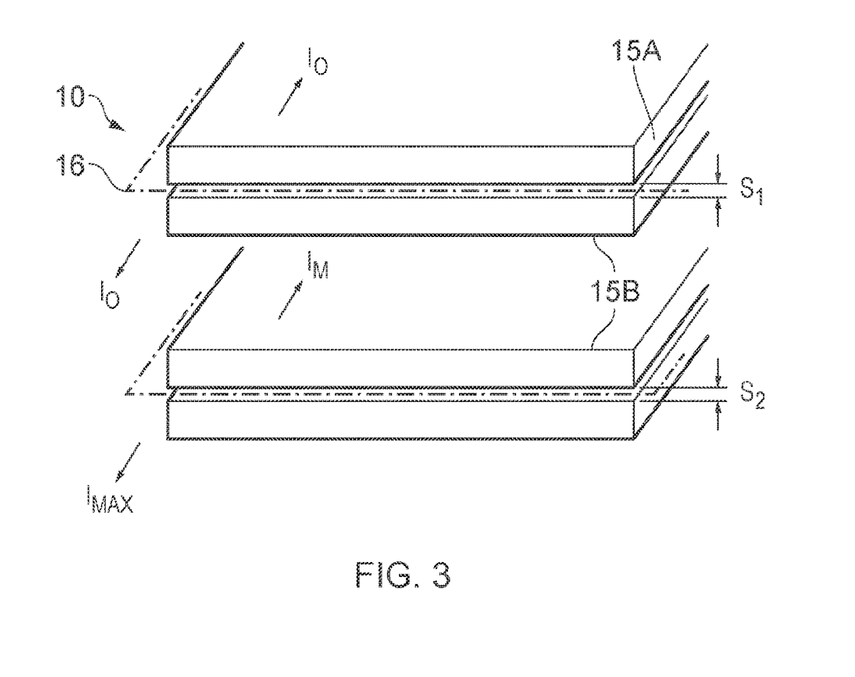
FIG. 3 illustrates the separation and operation of the actuator.

The embedded actuator according to the arrangement shown in FIG. 3 is provided with a current in a first direction in actuator half 15A and an opposing current direction in the other half of the actuator 15B, as illustrated by $I_0$ and $I_{Max}$ and the associated arrows in FIG. 3.

Importantly the two actuator halves 15A and 15B are electrically separated and isolated by an insulator 16 located between the two. This may for example be an additional layer of PEEK or a release layer of a suitable dielectric material such as, for example, Polyimide.

The upper image in FIG. 3 shows a situation when the actuators 15A and 15B are not electrically excited i.e. there is no electrical current passing through the two halves. No forces are generated and the separation of the two halves is $S_1$ The lower image in FIG. 3 shows a situation when the actuators 15A and 15B are provided with an electrical current $I_{Max}$. Ampere's force law means that as a result of the opposing current directions and the associated generation of magnetic fields the two halves are pushed apart creating a separation $S_2$ where $S_2 > S_1$.

This functionality of the actuator 10 is embedded into the middle of the de-icing apparatus shown in FIG. 2.

By pulsing a current through the actuator 10 extremely powerful impulses can be generated over very small distances, for example 10,000G over 1 mm.

This rapid impulse allows the surface of the de-icing apparatus immediately above the actuator to be rapidly displaced over this small distance meaning that the connection or adhesion between ice on the surface and the outer surface of the apparatus can be broken or disturbed.

Figure 4:
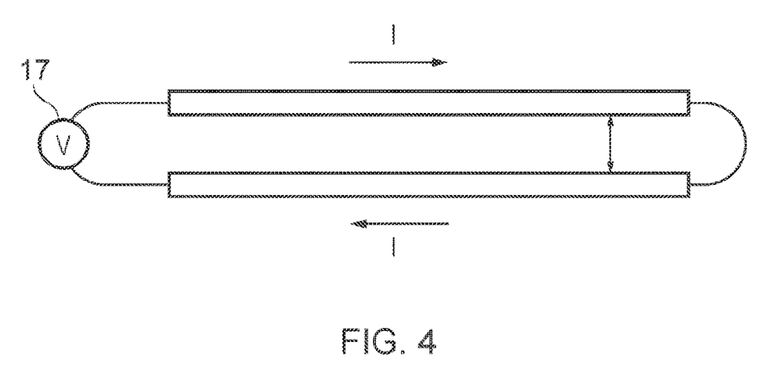
FIG. 4 illustrates an electrical circuit for the actuator.

FIG. 4 illustrates schematically the electrical circuit forming each actuator portion. It will be recognised that each apparatus may comprise multiple such actuators extending along the length of the apparatus or arranged over discrete areas or zones.

As shown in FIG. 4 at a first end an electrical supply and controller 17 is provided which can provide the necessary current and switching capability. At the opposing end the two halves are electrically connected together such that current is returned in an opposing direction. It will be recognised that the opposing current flows may be achieved in other electrical ways.

The controller may advantageously be configured to apply currents to multiple such actuators to cause ripples in the de-icing surface or even waves by applying currents are predetermined times or in particular sequences.

One or more actuators may be used to create complex waves or forces. For example, a single actuator could create a ripple in a defined locality on a surface, but a number of actuators would allow a stronger ripple (or complex wave) to be created and this could spread over a larger surface and depending on the positioning of the actuators, could allow for different degrees of force to be applied in selected localities. Some areas may collect more ice than others, for example because of profile and/or airflow, and these areas may have more actuators. A combination of single or multiple actuators may be used depending on the desired configuration in order to provide a targeted degree of ice removal depending on the location and extent of ice build-up.

Figure 5:
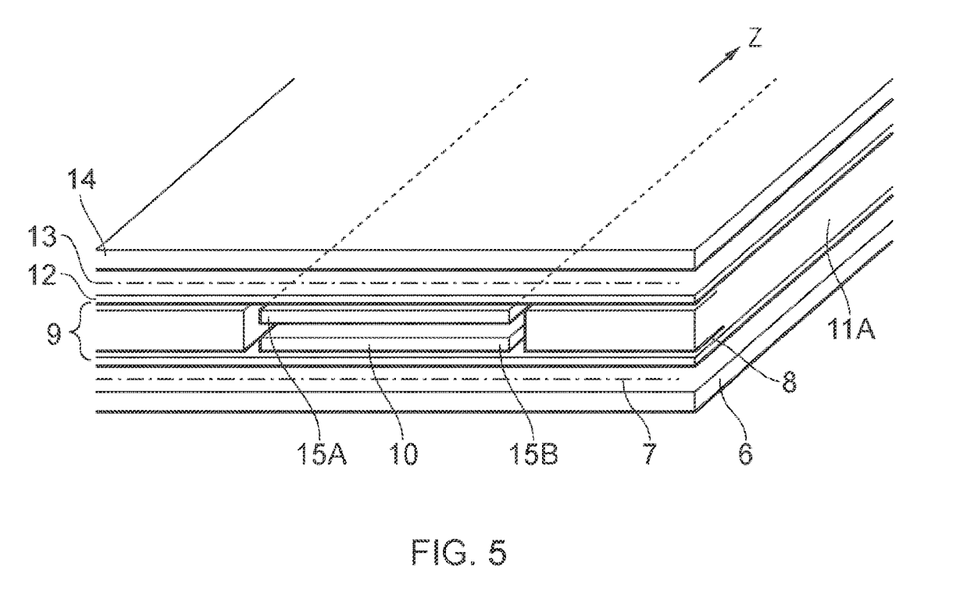
FIG. 5 shows a configuration of the actuator within the apparatus laminate structure.

FIG. 5 shows how the actuator extends in an example as a pair of parallel tracks 15A, 15B in a z direction. As shown the two halves of the actuator are substantially overlapping. This, in combination with their close proximity to each other and then depth maximises the effectiveness in the de-icing application since it maximises the impulse that can be generated whilst minimising the thickness. This reduces weight and allows complex geometries to be followed.

Figure 6:
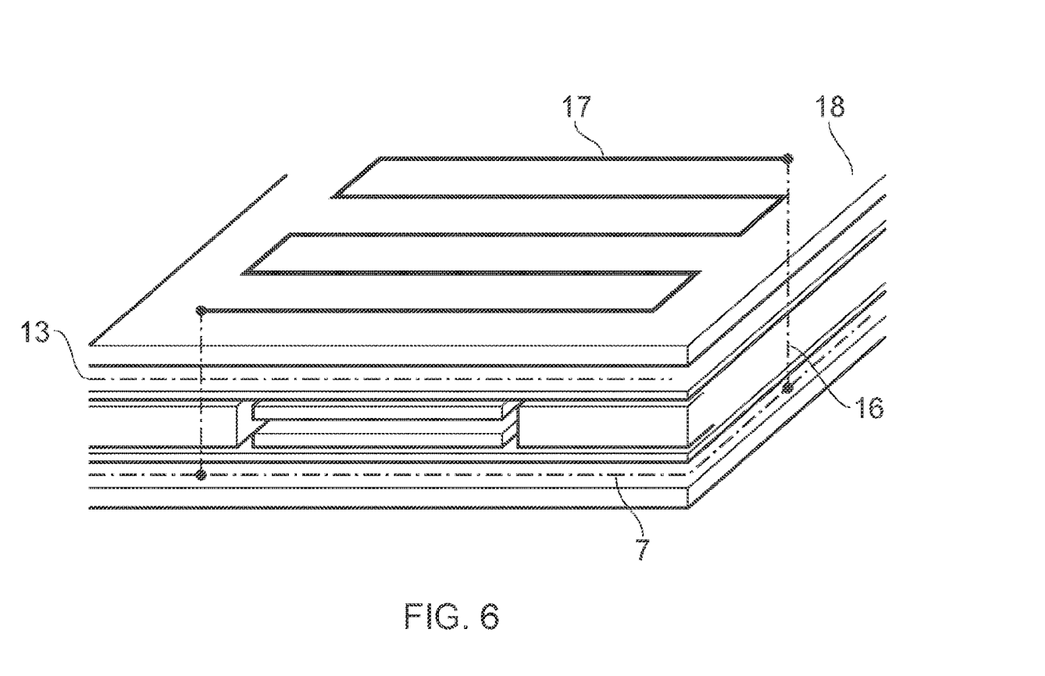
FIG. 6 shows the electrical connections from the power delivery layer to the heating circuit and an example of the heating circuit path.

FIG. 6 illustrates the electrical path between the power supply layer 7 and the heater layer 13. As shown a series of electrical connections 16 are provided through the laminate allowing power to be communicated from a power supply to the de-icer (not shown but located on the inner surface of the apparatus) to the heater circuit proximate to the outer surface of the de-icing apparatus. As illustrated the layer 13 has an alternative path 17 which dissipates heat in the design profile on the upper surface 18.

Figure 7:
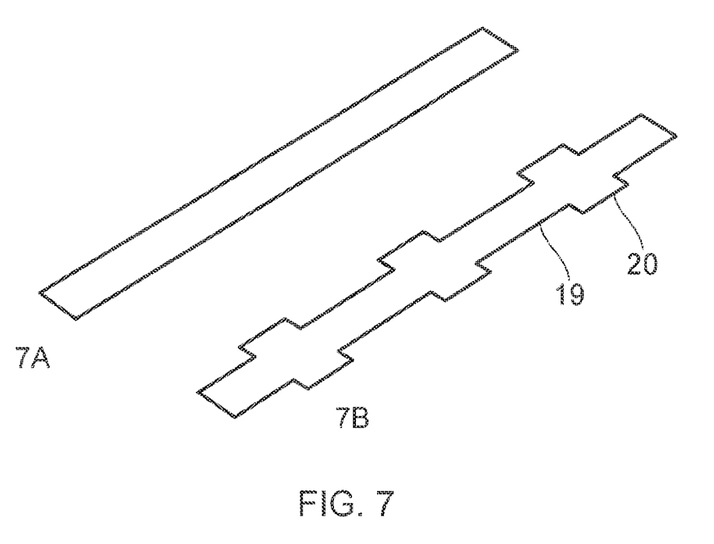
FIG. 7 shows two alternative profiles of actuator tracks.

FIG. 7 shows two alternative arrangements for the profile of the actuators. In FIG. 7A a uniform profile is shown. Such a profile will generate uniform impulses along the length of the actuator.

FIG. 7B shows an alternative arrangement in which the actuator is non-uniform and comprises regions with narrower width 19 and greater width 20. In regions of narrower width there will be greater current concentration and consequently (assuming the opposing actuator is the same) greater opposing forces. Such an arrangement allows for the optimisation of forces and thereby movement along the length of the apparatus. By adapting the two halves of the actuator the forces and displacements for a given current can be optimised and adapted to provide precisely the desired displacement of the de-icing apparatus over complex geometries.

The heating element described above is optional, and the de-icing apparatus may utilise the actuator concept at a separate location to the actuator.

Figure 8A:
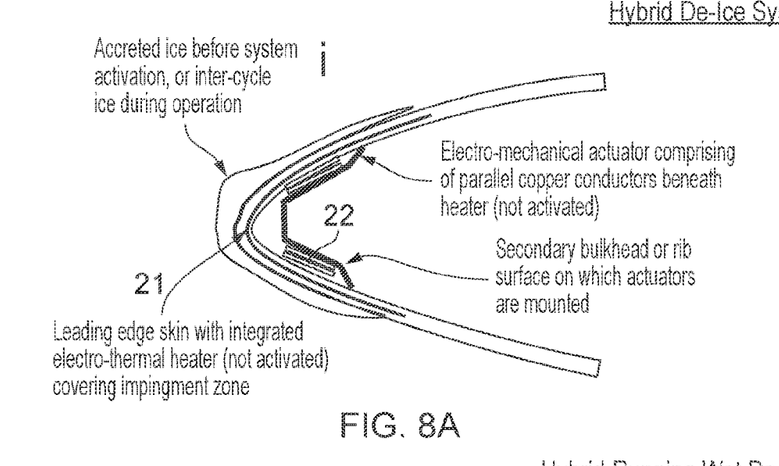
FIGS. 8A and 8B show another example de-icing system, incorporating an actuator.
Figure 8B:
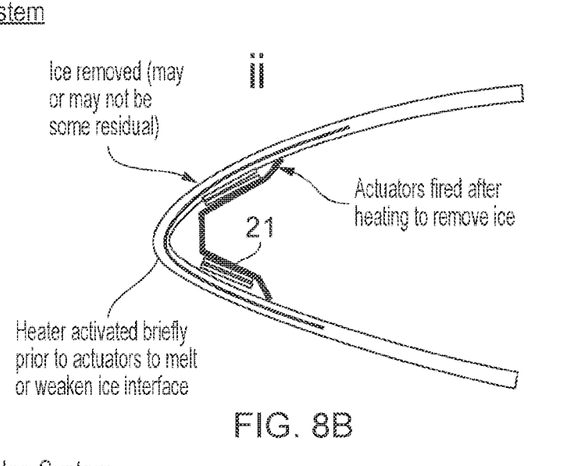

Referring to FIGS. 8A and 8B an alternative de-icing apparatus is shown.

FIG. 8A shows a situation where ice has built up on the leading edge of the wing. Here an electrical heater 21 is provided at the leading edge surface and may be activated once ice has built up. The heater can be activated in combination with the de-icing systems 22 located in the trailing regions of the wing. The de-icing apparatus 22 may optionally include and electrical heating layer and in combination with the leading edge heater 21 (formed using a conventional heater mat for example) may provide a hybrid anti-icing system using less electrical energy than heating the entire leading edge. Only a portion of the leading edge need require conventional heating mat technology. Here the de-icing apparatus is located immediately adjacent to the leading edge heater. FIG. 8B shows how ice has been removed.

Figure 9A:
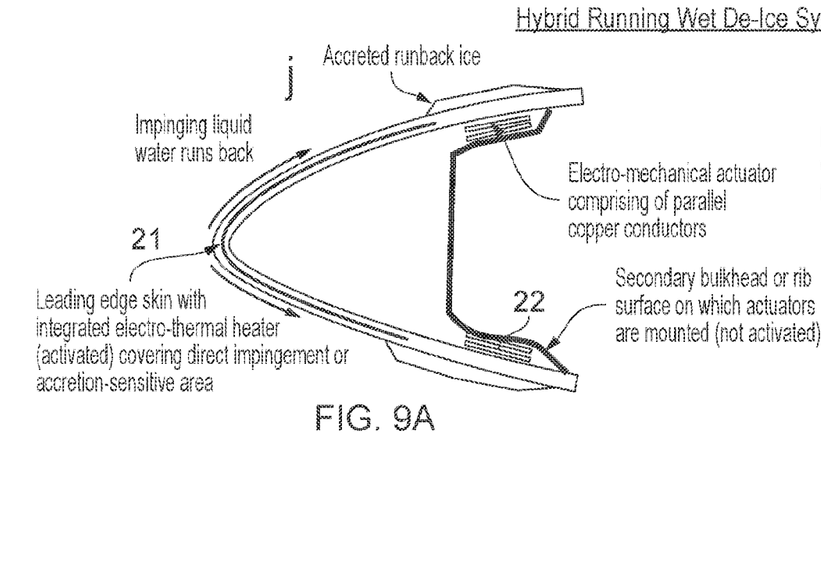
FIGS. 9A and 9B show another example de-icing system, incorporating an actuator.
Figure 9B:
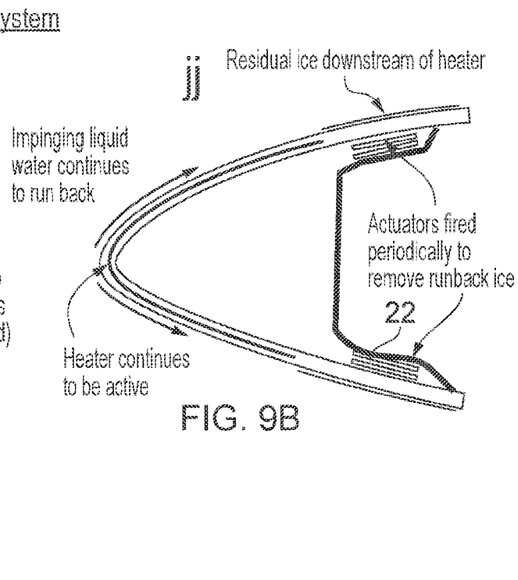

FIGS. 9A and 9B show a further alternative approach wherein a heater 21 is again provided at the leading edge. However, in this arrangement the de-icing apparatus 22 is located further towards the trailing edge of the wing. Here, an alternative approach is applied to ice removal. Specifically, the ice is melted by the leading edge heater 21 and allowed to flow towards the trailing edge of the wing. Once the water leaves the heated areas at the leading edge it begins to freeze. The de-icing apparatus 22 is that optimally position at a position where the ice begins to freeze. Activation of the actuators (and optional heating layer) allows the newly frozen ice to be periodically released from the surface by activating the actuators within the laminate layer as described above. In this hybrid arrangement the ice is melted and allowed to reform at a region where the actuators can be positioned.

Again, ice can be removed from the wing surface using less electrical power.

The two arrangements shown in FIGS. 9A and 9B allow a larger range of the wing to be de-iced for the same electrical consumption. The leading edge itself is de-iced using pure electrical heating power and the trailing regions are then de-iced using an actuator technique optionally in combination with an integrated electrical heating layer.

In the foregoing examples, a "hybrid" low-power IPS configuration is provided whereby the system is composed of both electro-thermal and electro-mechanical sub-systems, which work together to prevent, manage and remove ice formation on aircraft surfaces so that it remains within allowable limits for aircraft handling and performance.

Of these two sub-systems, the electro-thermal sub-system has by far the greater power consumption, and therefore its physical extent, temperature and duration of operation should be minimised.

The electro-mechanical sub-system has relatively low power consumption and therefore its effective operation should be maximised.

The hybrid system shown in FIGS. 8 and 9 exhibits a number of technical advantages including but not limited to:
  Improved performance and reduced weight compared to IPS based solely on electro-mechanical IPS
  Unlimited endurance in icing conditions
  Reduced maintenance requirements/costs compared to existing FPD systems
  Significantly lower power requirement compared to fully electro-thermal solutions.

These factors are particularly advantageous for smaller airframes while widening their ability to operate efficiently in icing conditions, as well as removing existing limitations on operation and endurance in those conditions.

Operation of the two arrangements shown in FIGS. 8 and 9 can be summarised as follows:

1) Hybrid De-Ice System FIG. 8 a. The hybrid de-ice system is applicable where the airframe application can tolerate a certain amount of inter-cycle ice accretion during exposure to icing conditions.

b. A certain amount of ice accretion is allowed to build up over the whole protected surface (see FIG. 8A). This amount of ice has a certain minimum thickness for the system to be effective, and a maximum thickness defined by airframe allowable ice limits. Ice thickness may be known using a direct means of ice detection, or based upon knowledge of the environmental conditions.

c. The heater is then activated for a duration which is just enough to either melt, or weaken the interface layer of ice immediately attached to the surface (i.e. to weaken the ice adhesion to the surface, but not to shed the ice)

d. Electro-mechanical actuators are then fired to shed the ice from the surface (see FIG. 8B). This may result in a completely clean surface, or there may be some residual ice remaining, depending on the precise design parameters and ambient conditions.

e. This process (b-d) is repeated cyclically while the IPS remains activated.

2) Hybrid Running-Wet De-Ice System FIG. 9 a. The hybrid running-wet system is applicable where a portion of the surface is required to be maintained free of ice ("clean") during system activation, while a downstream portion of the surface can tolerate a certain amount of inter-cycle ice accretion.

b. The area to be maintained free of ice is heated using an electro-thermal heater sufficiently so that its surface temperature is above 0° C., thus preventing impinging water droplets from freezing on the surface. This heating is maintained throughout the de-ice cycle.

c. The liquid water which runs back beyond the rearward extent of the heated area then freezes as the surface temperature drops below 0° C. This is known as "runback ice". This ice accretion occurs over the area affected by the electro-mechanical actuator.

d. The runback ice is allowed to build up to a thickness which is greater than a minimum value (defined by the thickness required for the expulsive action to be effective) and below a maximum value (defined by tolerances for aircraft handling). Ice thickness may be known using a direct means of ice detection, or based upon knowledge of environmental conditions.

e. The electro-mechanical actuators are then fired to shed the runback ice from the surface. There may be residual ice remaining on this part of the surface after the actuation event.

f. Steps d-e are repeated cyclically while the IPS is activated. The heater remains active throughout.

As discussed above this method and arrangement may be conveniently used in combination with the electro-magnetic force actuators described herein.

The leading edge component can further include an optical ice detection (OID) device which provides both detection of icing conditions and measurement of ice thickness. This could be used to automate IPS activation in the presence of icing conditions and/or once the required level of ice accretion has been reached for the system to be effective. This OID could be housed inside the surface to be protected, rather than relying on sensors from other parts of the aircraft which may not reflect the local conditions or ice accretion. This would result in a "smart" IPS able to operate automatically and with optimal efficiency.

Figure 10:
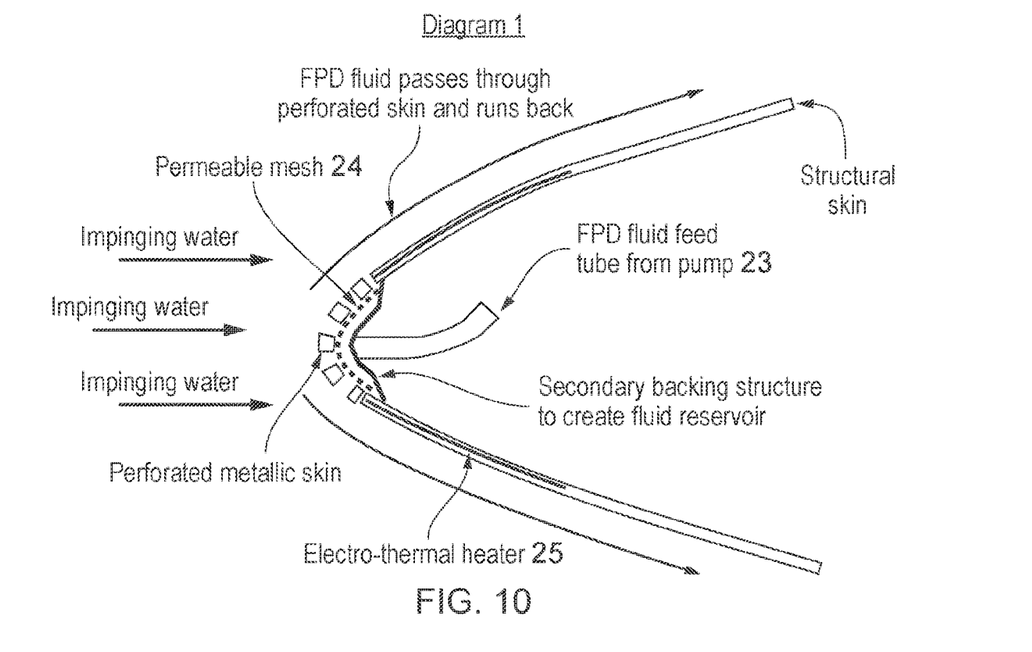
FIGS. 10 and 11 show another example fluid de-icing system incorporating an actuator.
Figure 11:
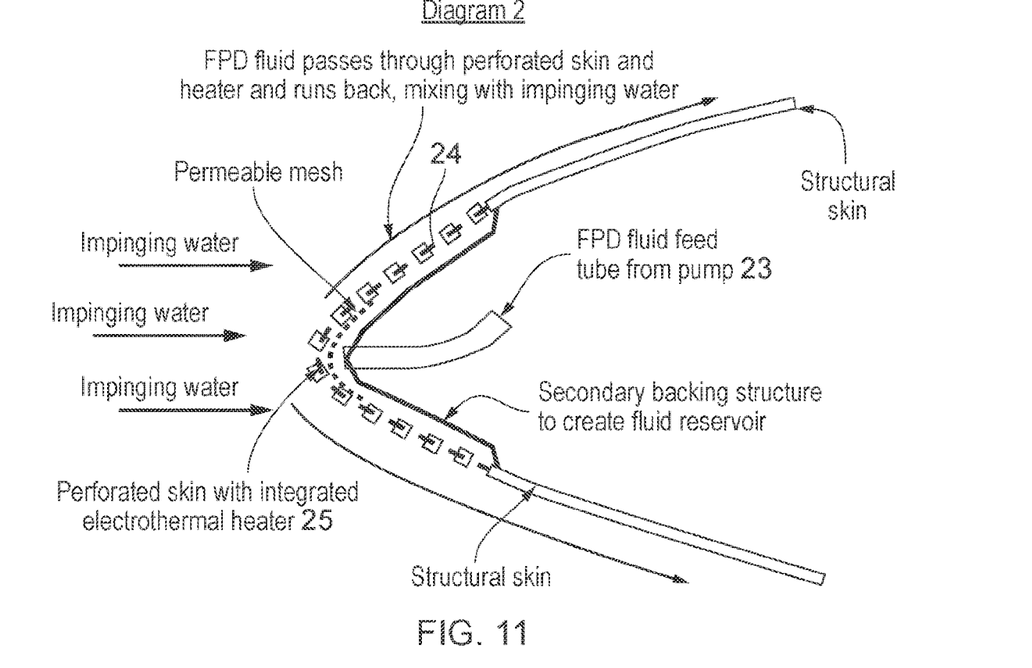

FIGS. 10 and 11 show a still further arrangement for de-icing.

In these arrangements the leading edge heater is replaced with a fluid based system in which an ice dissolving fluid is secreted through a conduit 23 and optional permeable leading edge surface 24.

Here, a "hybrid" low-power IPS configuration is provided whereby the system is composed of both electro-thermal and FPD fluid sub-systems, which work together to prevent, manage and remove ice formation on aircraft surfaces so that it remains within allowable limits for aircraft handling and performance. This solution is the arrangement, integration and method of operation as a single hybrid solution. The hybrid solution reduces the operational restrictions associated with existing FPD fluid ice protection systems, while using less power than electro-thermal ice protection systems.

Of these two sub-systems, the electro-thermal sub-system has by far the greater power consumption, and therefore its physical extent, temperature and duration of operation should be minimised.

The FPD fluid sub-system has relatively low power consumption (only a fluid pump is required) and therefore its effective operation should be maximised. However it also requires a continuous supply of FPD fluid during its activation, which has to be stored on the aircraft and transported to the required areas.

The hybrid system overall has:
  Improved endurance in icing conditions (or weight) compared to existing FPD fluid systems (through reduced fluid usage)
  Reduced power consumption compared to existing electro-thermal solutions, although greater than the power consumption of existing FPD fluid systems (due to the addition of electro-thermal heaters)
  Improved performance compared to electro-mechanical de-ice systems, without the efficiency losses of bleed-air systems.

In one arrangement (FIG. 10), the heaters are downstream of the FPD fluid panel and physically separated from it. The general principle of operation is as follows:

1. FPD fluid is secreted through a perforated leading edge parting strip; mixing with the impinging liquid water.
2. The water/FPD fluid mixture (with its reduced freezing point compared to liquid water alone) then runs back under the influence of the airflow over an electric heater which is integrated beneath the surface of the aircraft skin. Direct water impingement may still be occurring at this point (further diluting the water/FPD mixture, if the direct impingement area extends beyond the parting strip).
3. The electric heater is designed to prevent the runback water/FPD-fluid mixture from freezing downstream of the FPD fluid panel, by maintaining sufficient surface temperature (the value of which depends on the ratio of water and FPD fluid in the mixture)
4. The water/FPD-fluid mixture continues to run back beyond the downstream extent of the heater, where either it detaches from the surface or the risk of ice formation is deemed acceptable.

In a different arrangement (FIG. 11), the heaters are configured to also cover the FPD fluid panel area, thus further reducing the amount of FPD fluid needed. In this configuration the heater used in this area would need to be compatible with the perforations required for secretion of the FPD fluid.

In either configuration, the FPD-fluid panel and runback heater areas should be optimised in order to achieve the desired balance of fluid delivery/storage requirements (i.e. fluid flow rate) and power consumption (impacted most greatly by heater size and temperature). The exact trade-off for any given application will be determine by a large number of factors including required endurance, allowable ice shapes, weight, space and available power.

In either configuration, a means of dynamically adjusting the fluid flow rate and heater temperature to the changing ambient conditions would result in optimal performance throughout the flight envelope. It would also allow adjustment of the system bias between FPD fluid consumption and electrical power consumption during flight to optimise efficiency and performance. Or, additional heating power could be recruited from non-essential systems in an emergency if the on-board FPD fluid supply was not sufficient. Hence, a form of pseudo-redundancy is achieved in the aircraft ice protection system.

The technology used for the electro-thermal heating could employ the thin film, thermoplastic heater mat technology. If the configuration described in FIG. 11 is adopted, a different heater technology may be required in order to make the heater compatible with the perforated skin surface and the passage of FPD fluid through it.

The leading edge component can further include an optical ice detection device which provides both detection of icing conditions and measurement of ice thickness. This could be used to automate IPS activation in the presence of icing conditions and/or once the required level of ice accretion has been reached for the system to be effective. This OID could be housed inside the surface to be protected, rather than relying on sensors from other parts of the aircraft which may not reflect the local conditions or ice accretion. Such a development would result in a "smart" IPS able to operate automatically and with optimal efficiency.

The invention claimed is:

1. An ice removal apparatus for an aircraft, comprising:
    a laminate structure; and
    an electrically operable heater encapsulated in the laminate structure;
    wherein the laminate structure includes a plurality of layers; and
    at least two of the layers are selectively movable relative to each other to increase a separation of the two layers;
    wherein the layers include:
    a first thermoplastic heat dissipation layer;
    a second electrically operable heating element layer;
    a third electrically insulating thermoplastic layer;
    a fourth electrically insulating thermoplastic layer;
    a fifth electrical power supply layer; and
    a sixth thermoplastic backing layer;
    the ice removal apparatus further comprising an electrical actuator located between the third and fourth thermoplastic layers and overlapping the heating element layer such that the electrical actuator is arranged to cause displacement of a same area of surface heated by the heating element layer.

2. The ice removal apparatus of claim 1, wherein the electrical actuator is a pair of opposing electrical conductors separated by an electrical insulator.

3. The ice removal apparatus of claim 2, wherein the opposing electrical conductors are parallel and overlapping electrically conductive tracks.

4. The ice removal apparatus of claim 2, wherein the electrical actuator includes an elastomeric layer separating the opposing electrical conductors.

5. The ice removal apparatus of claim 2, wherein at least one of the electrical conductors is free to move relative to the electrical insulator.

6. The ice removal apparatus of claim 2, wherein the electrical conductors are electrically connected together at one end of the electrical actuator and arranged to be electrically coupled to an electrical supply at an opposite end of the electrical actuator.

7. The ice removal apparatus of claim 2, further comprising thermoplastic fillers located adjacent to each of the electrical conductors between the third and fourth thermoplastic layers.

8. The ice removal apparatus of claim 2, wherein an electrical path is provided between the second electrically operable heating element layer and the fifth electrical power supply layer.

9. The ice removal apparatus of claim 2, wherein the layers are cured together so that the first thermoplastic heat dissipation layer and the second electrically operable heating element layer are immediately adjacent and connected to each other, the second electrically operable heating element layer and the third electrically insulating thermoplastic layer are immediately adjacent and connected to each other, the fourth electrically insulating thermoplastic layer and the fifth electrical power supply layer are immediately adjacent and connected to each other, and the fifth electrical power supply layer and the sixth thermoplastic backing layer are immediately adjacent and connected to each other.

10. The ice removal apparatus of claim 2, wherein the electrical insulator is a thermoplastic material including two insulator outer surfaces and a discontinuity allowing the insulator outer surfaces to move apart relative to each other.

11. The ice removal apparatus of claim 10, wherein the discontinuity is a slit extending in a plane within the electrical insulator and parallel with the insulator outer surfaces.

12. The ice removal apparatus of claim 10, wherein the electrical insulator is two independent sub-layers immediately adjacent to each other.

13. The ice removal apparatus of claim 2, wherein the electrical conductors are overlapping elongate tracks having a constant width and cross-section.

14. The ice removal apparatus of claim 2, wherein the electrical conductors are overlapping elongate tracks with varying widths defining regions of greater surface area.

15. The ice removal apparatus of claim 1, further comprising a fluid delivery conduit arranged for alignment with a leading edge surface of an aerospace component, wherein the laminate structure is arranged for alignment with a trailing region of the aerospace component with respect to the leading edge surface.

16. The ice removal apparatus of claim 15, further comprising a perforated surface positioned for communication of fluid from the fluid delivery conduit through the leading edge surface.

17. A method of de-icing an aerospace component comprising:
    providing an ice removal apparatus including a laminate structure including a plurality of layers, an electrically operable heater encapsulated in the laminate structure, and an electrical actuator located between two of the layers, wherein the layers include:
    a first thermoplastic heat dissipation layer;
    a second electrically operable heating element layer;
    a third electrically insulating thermoplastic layer;
    a fourth electrically insulating thermoplastic layer;
    a fifth electrical power supply layer; and
    a sixth thermoplastic backing layer;
    the ice removal apparatus further including an electrical actuator located between the third and fourth thermoplastic layers and overlapping the heating element layer such that the electrical actuator is arranged to cause displacement of a same area of surface heated by the heating element layer; and
    electrically exciting the electrically operable heater and the electrical actuator;
    wherein electrically exciting the electrical actuator selectively moves the layers relative to each other to increase a separation of two of the layers.

18. The method of claim 17, wherein electrically exciting the electrical actuator causes a wave to pass along the aerospace component.

19. The method of claim 17, further comprising
providing an electric heater at a leading edge of the aerospace component, wherein the laminate structure is at a trailing region of the aerospace component;
electrically exciting the electrical heater to cause ice to melt and flow from the leading edge towards the trailing region;
allowing ice to re-form at a portion of the trailing region adjacent to the laminate structure, wherein electrically exciting the electrical actuator is performed after allowing the ice to re-form at the portion of the trailing region adjacent to the laminate structure.

\* \* \* \* \*